United States Patent
Glazemakers et al.

(10) Patent No.: US 9,560,015 B1
(45) Date of Patent: Jan. 31, 2017

(54) SYSTEMS AND METHODS FOR PROTECTING NETWORK DEVICES BY A FIREWALL

(71) Applicant: Cryptzone North America, Inc., Waltham, MA (US)

(72) Inventors: Kurt Glazemakers, Grembergen (BE); Natan Abolafya, Gothenburg (SE); Gokhan Berberoglu, Gothenburg (SE); Thomas Bruno Emmanuel Cellerier, Kungalv (SE); Aitor Perez Iturri, Gothenburg (SE); Per Leino, Gothenburg (SE); Jamie Bodley-Scott, Northants (GB)

(73) Assignee: CRYPTZONE NORTH AMERICA, INC., Waltham, MA (US)

( * ) Notice: Subject to any disclaimer, the term of this patent is extended or adjusted under 35 U.S.C. 154(b) by 0 days.

(21) Appl. No.: 15/168,863

(22) Filed: May 31, 2016

Related U.S. Application Data

(60) Provisional application No. 62/321,296, filed on Apr. 12, 2016.

(51) Int. Cl.
*H04L 29/06* (2006.01)
*H04L 12/46* (2006.01)

(52) U.S. Cl.
CPC ....... *H04L 63/0263* (2013.01); *H04L 12/4633* (2013.01); *H04L 63/0272* (2013.01); *H04L 63/0838* (2013.01)

(58) Field of Classification Search
CPC ............. H04L 63/0263; H04L 63/0272; H04L 63/0838; H04L 12/4633
See application file for complete search history.

(56) References Cited

U.S. PATENT DOCUMENTS

| | | | |
|---|---|---|---|
| 5,889,942 | A | 3/1999 | Orenshteyn |
| 6,381,631 | B1 | 4/2002 | Van Hoff |
| 6,766,454 | B1 | 7/2004 | Riggins |
| 7,444,518 | B1 | 10/2008 | Dharmarajan et al. |
| 7,661,131 | B1 | 2/2010 | Shaw et al. |

(Continued)

FOREIGN PATENT DOCUMENTS

EP 2144460 1/2010

OTHER PUBLICATIONS

AppGate 10.2.3 manual, 2004.

(Continued)

*Primary Examiner* — Darren B Schwartz
(74) *Attorney, Agent, or Firm* — Greenberg Traurig, LLP

(57) ABSTRACT

A computer-implemented method, including: upon a request from a client device, establishing, by a computer system implementing a gateway to a private network, a network tunnel between the client device and the gateway; the gateway further implementing a firewall including firewall rules for selectively blocking and allowing network traffic between the client device and one or more network devices in the private network; upon a triggering of a firewall rule by a request for access to the private network by the client device and before applying the firewall rule, checking, by the computer system, if a corresponding condition is met; and if the condition is not met, then, by the computer system, sending to the client device an action to be performed by the client device.

21 Claims, 8 Drawing Sheets

(56) References Cited

U.S. PATENT DOCUMENTS

| | | | |
|---|---|---|---|
| 7,665,130 B2 | 2/2010 | Johnston et al. | |
| 7,721,084 B2 | 5/2010 | Salminen et al. | |
| 7,809,003 B2 | 10/2010 | Makela | |
| 8,001,610 B1 | 8/2011 | Chickering et al | |
| 8,353,021 B1 | 1/2013 | Satish et al. | |
| 8,868,757 B1 | 10/2014 | Liu et al. | |
| 9,148,408 B1 | 9/2015 | Glazemakers et al. | |
| 9,300,629 B1* | 3/2016 | Jahr | H04L 63/02 |
| 2002/0026503 A1 | 2/2002 | Bendinelli et al. | |
| 2002/0049914 A1 | 4/2002 | Inoue et al. | |
| 2002/0053031 A1 | 5/2002 | Bendinelli et al. | |
| 2002/0091859 A1 | 7/2002 | Tuomenoksa et al. | |
| 2002/0093915 A1 | 7/2002 | Larson | |
| 2002/0099937 A1 | 7/2002 | Tuomenoksa | |
| 2003/0009693 A1* | 1/2003 | Brock | G06F 21/554 726/23 |
| 2003/0041136 A1 | 2/2003 | Cheline et al. | |
| 2003/0051169 A1* | 3/2003 | Sprigg | G06F 9/468 726/4 |
| 2003/0055994 A1 | 3/2003 | Herrmann et al. | |
| 2003/0131263 A1 | 7/2003 | Keane et al. | |
| 2003/0145226 A1* | 7/2003 | Bruton, III | H04L 63/1408 726/22 |
| 2003/0200321 A1 | 10/2003 | Chen et al. | |
| 2004/0044910 A1 | 3/2004 | Ylipieti | |
| 2004/0073666 A1 | 4/2004 | Foster et al. | |
| 2004/0167984 A1 | 8/2004 | Herrmann | |
| 2004/0268121 A1* | 12/2004 | Shelest | H04L 63/0272 713/156 |
| 2005/0246767 A1 | 11/2005 | Fazal et al. | |
| 2005/0273850 A1* | 12/2005 | Freund | H04L 63/0227 726/14 |
| 2005/0273853 A1 | 12/2005 | Oba et al. | |
| 2006/0037075 A1* | 2/2006 | Frattura | H04L 12/2602 726/22 |
| 2006/0041756 A1 | 2/2006 | Ashok et al. | |
| 2006/0053296 A1 | 3/2006 | Busboom et al. | |
| 2006/0143702 A1 | 6/2006 | Hisada et al. | |
| 2006/0161965 A1* | 7/2006 | Shelest | G06F 21/55 726/1 |
| 2006/0190987 A1 | 8/2006 | Ohta et al. | |
| 2007/0074049 A1 | 3/2007 | Frenkel et al. | |
| 2007/0101405 A1 | 5/2007 | Engle et al. | |
| 2007/0209081 A1 | 9/2007 | Morris | |
| 2007/0299954 A1 | 12/2007 | Fatula | |
| 2008/0046995 A1 | 2/2008 | Satterlee et al. | |
| 2008/0052775 A1 | 2/2008 | Sandhu et al. | |
| 2008/0082640 A1 | 4/2008 | Chang et al. | |
| 2008/0130897 A1 | 6/2008 | Donatelli et al. | |
| 2008/0178278 A1 | 7/2008 | Grinstein et al. | |
| 2008/0235755 A1* | 9/2008 | Blaisdell | H04L 63/102 726/1 |
| 2008/0301801 A1 | 12/2008 | Jothimani | |
| 2009/0113540 A1 | 4/2009 | Chandwani | |
| 2009/0119749 A1 | 5/2009 | Datla et al. | |
| 2009/0249440 A1 | 10/2009 | Platt et al. | |
| 2009/0254970 A1* | 10/2009 | Agarwal | H04L 63/1425 726/1 |
| 2009/0300750 A1 | 12/2009 | Chou et al. | |
| 2009/0328219 A1* | 12/2009 | Narayanaswamy | H04L 63/1425 726/23 |
| 2010/0175124 A1 | 7/2010 | Miranda | |
| 2010/0306530 A1 | 12/2010 | Johnson et al. | |
| 2011/0016509 A1 | 1/2011 | Huang et al. | |
| 2011/0030045 A1 | 2/2011 | Beauregard et al. | |
| 2011/0107411 A1 | 5/2011 | McClain et al. | |
| 2011/0282997 A1* | 11/2011 | Prince | H04L 63/1458 709/226 |
| 2012/0210002 A1 | 8/2012 | McQuade | |
| 2013/0247142 A1 | 9/2013 | Nishizawa et al. | |
| 2014/0109175 A1 | 4/2014 | Barton et al. | |
| 2014/0223541 A1 | 8/2014 | Yoon et al. | |
| 2015/0293756 A1 | 10/2015 | Wright | |
| 2015/0341443 A1 | 11/2015 | Shen et al. | |
| 2016/0099916 A1 | 4/2016 | Glazemakers et al. | |
| 2016/0112374 A1 | 4/2016 | Branca | |

OTHER PUBLICATIONS

Internationa Patent Application PCT/US2016/036053, International Search Report and Written Opinion, Jun. 24, 2016.

International Patent Application PCT/US2015/050485 International Search Report and Written Opinion, Jan. 12, 2016.

International Patent Application PCT/US2016/036238, International Search Report and Written Opinion, Sep. 2, 2016.

\* cited by examiner

| NAME | AWS admin entitlements | | |
|---|---|---|---|
| CONDITION | NOT (PublicNetwork) \|\| OTP | | |
| ACTION | OTP | | |
| ACCESS RULES | | | |―

| RULE | PROTOCOL | DIRECTION | HOSTS | PORTS / ICMP TYPES |
|---|---|---|---|---|
| allow | tcp | up | aws://security-group:private_security_group | 22, 3389 |
| allow | icmp | up | aws://security-group:private_security_group | 0-255 |

Fig. 4A

| NAME | pinging | | |
|---|---|---|---|
| CONDITION | false | | |
| ACTION | DisplayMessage("This pinging action is logged by our system") | | |
| ACCESS RULES | | | |

| RULE | PROTOCOL | DIRECTION | HOSTS | PORTS / ICMP TYPES |
|---|---|---|---|---|
| allow | icmp | up | 192.168.0.1 – 192.168.0.20 | 0-255 |

Fig. 4B

| NAME | Source code | |
|---|---|---|
| CONDITION | LocalFWActive | |
| ACTION | DisplayMessage("Activate firewall to access github.local.com") | |
| ACCESS RULES | | |

| RULE | PROTOCOL | DIRECTION | HOSTS | PORTS / ICMP TYPES |
|---|---|---|---|---|
| allow | tcp | up | github.local.com | 22, 3389 |
| allow | icmp | up | github.local.com | 0-255 |

Fig. 4C

| NAME | Intrusion on gateway | |
|---|---|---|
| CONDITION | false | |
| ACTION | InterruptFirewall | |
| ACCESS RULES | | |

| RULE | PROTOCOL | DIRECTION | HOSTS | PORTS / ICMP TYPES |
|---|---|---|---|---|
| block | tcp/udp | up/down | 192.168.0.50 | 1000-8000 |
| block | icmp | up/down | 192.168.0.50 | 0-255 |

Fig. 4D

SYSTEMS AND METHODS FOR PROTECTING NETWORK DEVICES BY A FIREWALL

RELATED APPLICATIONS

This application claims priority to U.S. Provisional Application Ser. No. 62/321,296, filed Apr. 12, 2016, entitled "SYSTEMS AND METHODS FOR PROTECTING NETWORK DEVICES BY A FIREWALL," by Glazemakers et al., the entire contents of which application is incorporated by reference as if fully set forth herein.

FIELD OF THE TECHNOLOGY

At least some embodiments disclosed herein relate generally to network protection and more particularly but not limited to the protection of private networks by a gateway including a tunnel server such as a Virtual Private Network (VPN) server and including a firewall.

BACKGROUND

In order to protect private networks from unwanted network access, a firewall may be implemented in a gateway in order to selectively filter communication to and from the private network. By applying firewall rules, the firewall then lets network packets pass, or blocks them in one or both directions, typically referred to as the up or down direction. The rules are typically based on a 5-tuple being the source and/or destination addresses of the network packets, the source and/or destination ports of the network packets and the protocol.

In order to protect a private network further, the gateway's firewall may be combined with network tunneling. Access to the private network may then be established by a Virtual Private Network (VPN) where a secured networking tunnel is setup between a client device and the gateway. The setup of such a tunnel is only granted upon successful authentication with the gateway which then functions as a VPN server. By the combination of a firewall and VPN server in the gateway, access to devices in the private network can be authorized on client or user level by the VPN server and on network level by the firewall. An example of such a gateway solution is disclosed in U.S. Pat. No. 9,148,408, the entire disclosure of which is hereby incorporated herein by reference. In this solution, firewall rules are determined based on an authorization with an authentication server or controller. This way, client and thus user access to applications and servers is controlled centrally at a single gateway without a need for further deep-packet inspection in the gateway or anywhere in the private network.

SUMMARY OF THE DESCRIPTION

A problem with the above solution is that it provides limited possibilities for dynamic access control (e.g., access control in between the time that the firewall rules are refreshed or updated). This is because the firewall rules are determined by the authentication controller when the user authenticates with the controller for the first time or when the user re-authenticates, for example after a predetermined time interval.

At least some embodiments disclosed herein alleviate the above problems and provide a gateway for protecting a private network that can provide dynamic access control.

Embodiments of the present disclosure help to protect network devices from unauthorized access. Among other things, embodiments of the disclosure allow full access to application servers and other network devices that a client is authorized to access, while preventing all access (or even knowledge) of network devices the client is not authorized to access.

In one embodiment, a computer-implemented method includes: upon a request from a client device, establishing, by a computer system implementing a gateway to a private network, a network tunnel between the client device and the gateway; the gateway further implementing a firewall including firewall rules for selectively blocking and allowing network traffic between the client device and one or more network devices in the private network; and, upon a triggering of a firewall rule by a request for access to the private network by the client device and before applying the firewall rule, checking, by the computer system, if a corresponding condition is met; and, if the condition is not met, then, by the computer system, sending to the client device an action to be performed by the client device.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF THE DRAWINGS

FIGS. 4A, 4B, 4C and 4D illustrate exemplary entries in a client access list from which firewall rules are derived according to embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
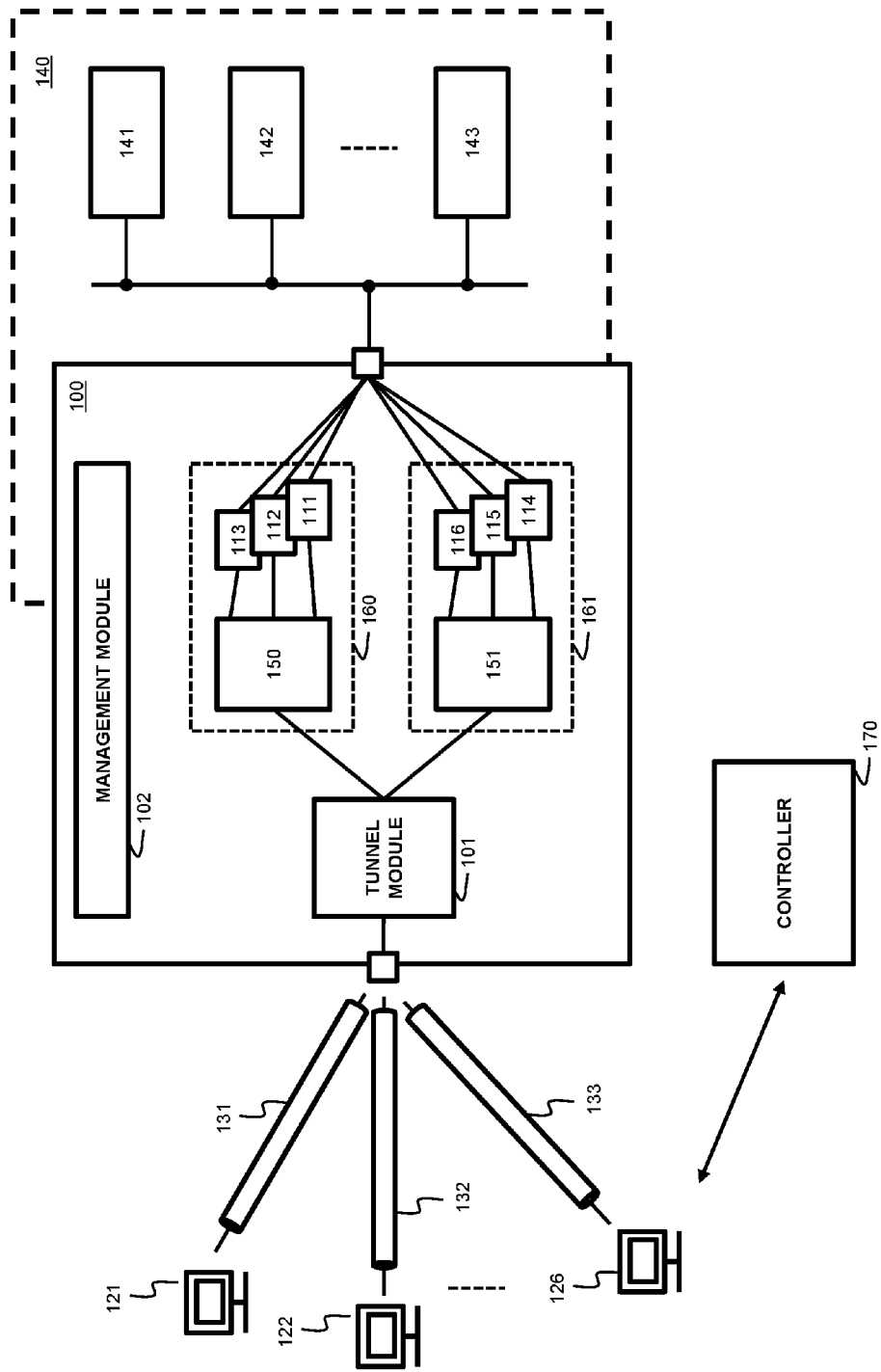
FIG. 1 shows an exemplary system for the protection of network devices from unwanted network access according to one embodiment of the present disclosure.

FIG. 1 illustrates an exemplary system for the protection of network devices from unwanted network access according to various aspects of the present disclosure. In this example, network devices (e.g., application servers 141, 142 and 143) are part of a private network 140. Access to the servers 141-143 is obtained from within the private network 140 via a private network address. In this context, the term "private" refers to the fact that the application servers 141-143 are not globally routable. In other words, the application servers 141-143 cannot be addressed by their private network address from outside the private network 140.

The private network 140 and other components in FIG. 1 may utilize any number and type of communication protocols, also referred to as the Internet Protocol ("IP"), or as the Transmission Control Protocol/Internet Protocol ("TCP/IP"). For example, the private network 140 may have address ranges as set by RFC 1918 for Internet Protocol Version 4 or IPv4 and RFC 4193 for Internet Protocol Version 6 or IPv6.

Networking devices 141-143 may correspond to application servers that provide services over the network 140 to other computing devices. Any number and type of application servers and associated services may be used in conjunction with embodiments of the present disclosure, such as mail servers, file servers, Customer Relationship Management or CRM services, Enterprise Resource Planning or ERP services, and/or document management services.

A data connection may then be established with any of application servers 141-143 by opening a communication socket with the respective application server on a port (or port range) associated with the service. Application servers 141-143 may correspond to physical devices with a physical networking interface associated with a private network address. Alternatively, application servers 141-143 may also correspond to virtual server instances running on one or more physical servers. Virtual server instances may each have a virtual network interface with an associated private network address. Virtual server instances may include, as well as operate in conjunction with, one or more user space instances (also known as software containers, virtual engines, virtual private servers, and/or jails). Such user space instances may be implemented in any suitable manner, including via the DOCKER software tool.

In the example shown in FIG. 1, the private network 140 is separated from an external network by a gateway 100, thereby allowing networking traffic between an external network and the private network 140 in a controlled way. The system of FIG. 1 can identify clients 121-126 as "trusted clients" having access rights to one or more of the application servers 141-143 within the private network 140 in order to use the services running thereon. The clients 121-126 may be, or include, physical hardware and/or virtual components. For example, a client 121-126 may include a virtual operating system running on a physical device, such as a mobile device. The system can also grant network access to a selection of the application servers 141-143 which the clients 121-126 are allowed to access, and deny network access to any application server the clients 121-126 are not allowed to access.

In order to control access by the clients 121-126 to the application servers 141-143, networking tunnels 131-133 are established between the clients 121-126 and the gateway 100. This way, the private network 140 is extended to the clients 121-126. In some embodiments, a virtual private network (or "VPN") is established through tunnels 131-133. In this manner, a client 121-126, although not physically in the private network 140, is provided a private network address in the range of the private network 140, and can thus potentially access all application servers 141-143 by their respective private network address (provided access is allowed, as is discussed in more detail below).

The network connection requests from clients 121-126 are handled by tunnel module 101 implemented in gateway 100. This may be a connection request for establishing a new tunnel by a new client device or a new network connection request within an existing tunnel. The data travelling over the connections in the tunnels 131-133 may further be protected by encryption, such as according to the Internet Protocol Security (or "IPsec protocol,") Transport Layer Security (or "TLS") and/or Datagram Transport Layer Security (or "DTLS"). In an example, the tunnel module 101 operates according to TLS or SSL and sets up the networking connections as TCP network connections. In order to do so, the clients send the request to an open port or port range of the gateway 100, preferably the standard port 443 for TLS/SSL encrypted TCP connections.

Gateway 100 further implements a firewall service including a firewall for selectively blocking and allowing network traffic between the client devices 121-126 and the respective network devices 141-143 in the private network. Gateway 100 may for example implement a firewall service 111-116 for each connected client 121-126. Each respective firewall service then implements a firewall for selectively blocking and allowing network traffic between the respective the client device and the network devices 141-143 in the private network. Each firewall service also comprises a set of firewall rules defining the access rules for a respective client device. The gateway 100 thus runs a separate firewall for each connected client 121-126. An advantage of this is that the size of the firewall rules of a firewall service does not grow with the amount of connected clients. This way, an increase in connected clients does not result in a performance loss due to an increase in the amount of firewall rules that have to be managed by a single firewall service.

Figure 2:
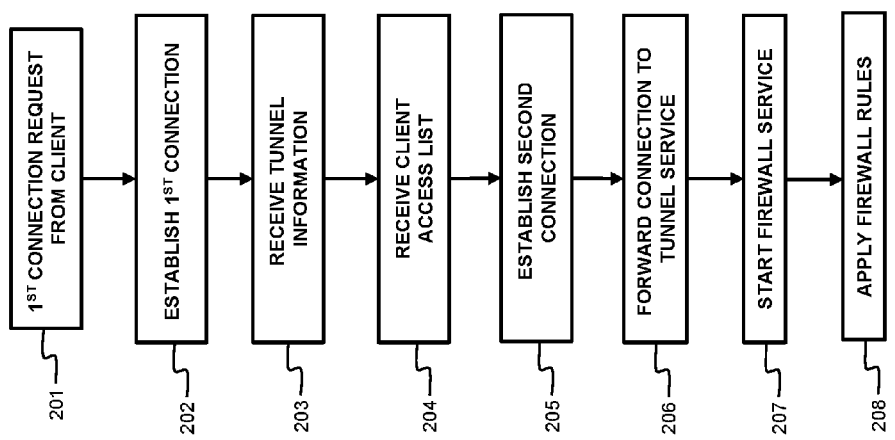
FIG. 2 shows an exemplary process for establishing a networking tunnel between a client device and a private network that may be executed by components of the present disclosure.

FIG. 2 shows an exemplary process that may be executed by components of the present disclosure including the gateway 100 according to FIG. 1. By this process, a client device 121-126 is connected to the private network 140 through the gateway 100. As an example, the process will be described with reference to client device 121. In a first step 201, the tunnel module 101 receives a first connection request from client networking device 121 to establish a first network connection with the gateway 100, for example a secured TCP network connection request received on port 443 of the gateway. Thereupon, the network connection is established under step 202, for example, by a three way handshake in the case of a TCP network connection. This first network connection is used to exchange control information between the client 121 and the gateway 100, and more particularly with the management module 102 implemented in the gateway 100. In order to know that the connection is for control purposes, the tunnel module may inspect the first data packet exchanged over each newly established network connection. If the data packet is a control data packet, the tunnel module 101 identifies the network connection as a control connection and will redirect all further packets received over this connection to the management module 102. The control data packet may for example be identified by inspecting a specific TLS extension field in the header of the TLS packet.

In step 203, the management module 102 receives tunnel information from the client device 121 over the first network connection. This information is further referred to as the client tunnel list. This client tunnel list includes information in order to establish the networking tunnel 131 with the gateway such as for example authentication information for authenticating the client with the gateway. After successful authentication by the management module 102, the process proceeds to step 204.

In step 204, the management module 102 receives a client access list from client 121. This client access list comprises a listing of the networking devices or applications in the private network 140 that the client device is allowed to access and under which conditions, as will be explained below.

The client 121 may further retrieve this client access list and/or tunnel list from an authentication service or controller 170 that manages the client access to private network 140. In order to avoid that the client compromises the client access list and/or tunnel list, the lists may be made unalterable, i.e., protected such that an alteration of the lists may be detected by the management module 102.

Various methods and systems for authenticating the client and providing a client and tunnel list can be used, such as those disclosed in U.S. Pat. No. 9,148,408, the entire disclosure of which is hereby incorporated by reference.

Then, in step 205, the tunnel module 101 establishes a second network connection with the client 121 upon request of the client 121. As this is a new connection, the tunnel module 101 inspects the first data packet received over this second connection. This second connection is used for the actual networking tunnel 131 because the client 121 has already established the first connection for the exchange of control information with the gateway 100. The inspected data packet is therefore identified as a first packet for the not yet established networking tunnel 131.

Thereupon, in step 206, the tunnel module 101 passes the second network connection to the tunnel service 150 implemented on the gateway 100. The tunnel service then verifies with the management module 102 whether the networking tunnel 131 can be established. In the following step 207, the tunnel service 150 establishes the networking tunnel 131 by starting the firewall service 111. From this moment on, all data exchanged over the second network connection and thus over the networking tunnel 131 passes through firewall service 111. In other words, payload data from the networking tunnel 131 is forwarded to the started firewall service 111. This firewall service 111 implements a firewall that blocks by default all traffic between the client 121 and private network 140. In the next step 208, firewall service 111 applies the appropriate firewall rules to the firewall by retrieving the firewall rules from the management module 102. The management module 102 derives these firewall rules from the client access list that was already been received in step 204.

By the process according to FIG. 2, a network tunnel 131 between the client device 121 and the gateway 100 is thus established together with a separate firewall with a separate set of firewall rules for selectively blocking and allowing network traffic between the client device 121 and the network devices 141-143 in the private network 140. This process is performed for every client 121-126 that connects to the private network 140 thereby obtaining the respective firewall services 111-116.

According to a further embodiment, the gateway 100 is implemented on a computer system comprising multiple processing cores. Management module 102, tunnel module 101, tunnel service 150 and firewall services 111, 112 and 113 may then be implemented on the computer system by computer-executable instructions executed on the processing cores. The gateway 100 then includes a separate tunnel service running on each processing core. This is illustrated by the exemplary embodiment of FIG. 1 where tunnel service 150 and firewall services 111, 112 and 113 are implemented on the first processing core 160 and tunnel service 151 and firewall services 114, 115 and 116 are implemented on a second processing core 161. Tunnel services 150 and 151 may for example be implemented as software processes running on the respective processing cores. The firewall services may be implemented as software threads run by the respective software process, i.e., the respective tunnel services.

An advantage of running separate tunnel services on each processing core is that inter-process communication between the firewall services and communication between a firewall service and the tunnel service is limited to the same core. As a result, when the gateway 100 scales up by adding more processing cores, there will be no loss in performance due to increased inter-process communication.

Figure 3:
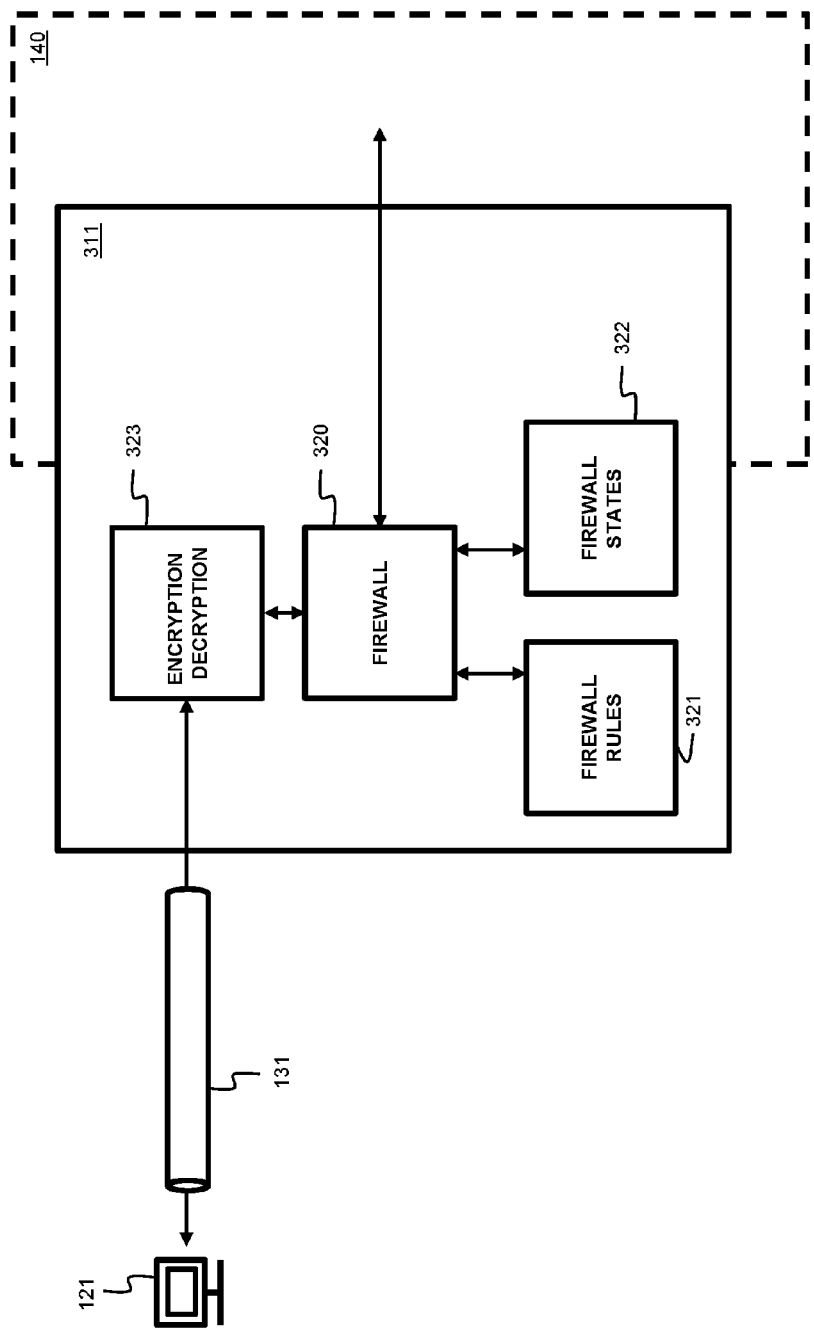
FIG. 3 shows an exemplary system for the establishment of a networking tunnel between a client device and a private network separated by a gateway implementing a firewall service.

FIG. 3 illustrates details of an exemplary firewall service 311 that may be implemented in a gateway 100 according to the present disclosure, for example as the firewall service 111 to 116 of FIG. 1. For the sake of example, it will be assumed that firewall service 311 corresponds to firewall service 111 providing the networking tunnel 131 between client 121 and private network 140. When firewall service 311 is started, it comprises a firewall component 320 for selectively blocking and allowing network traffic between the respective client device 121 and the network devices 141-143 in the private network 140. The rules used by the firewall 320 according to which the traffic is blocked or allowed are stored as firewall rules 321. These rules may for example be stored in a file or database residing in memory of the computing system implementing the gateway 100.

Firewall 320 may be a stateful firewall by performing stateful packet inspection thereby keeping track of the state of networking connections established over the networking tunnel 131 between client 121 and network devices 141-143 in private network 140. Such connection may relate to TCP or UDP networking connections. This way, a finer grained control is possible as the rules become dependent on the network connection and are thus dynamic. The firewall keeps track of all open network connections by maintaining a list, the state list 322, with all the pending connections. These states may for example be stored in a file or database residing in memory of the computing system implementing the gateway 100.

Firewall service 311 may further include an encryption and/or decryption component 323 for respectively encrypting and decrypting data transmitted to or received from the client 121. Encryption and decryption may further be performed according to the Internet Protocol Security (or "IPsec protocol,") Transport Layer Security (or "TLS") and/or Datagram Transport Layer Security (or "DTLS"). Encrypting and decrypting may further be hardware accelerated by a hardware component in the processing core the firewall service 311 is running on.

According to a further embodiment, the client access list comprises one or more access rules, optionally a condition related to one or more access rules and an action related to a respective condition.

An access rule defines when a network packet is to be allowed through the gateway and thus through the firewall at the network level. An access rule may include a source address indicative for the source from where the network packet originates. In an IP based firewall this may be an IPv4 or IPv6 address together with a port number or range of port numbers. Because the client access list includes the rules for a specific client device, an access rule will typically include the source address of the client device. The source port numbers are typically unspecified because the source port number normally has no specific meaning. An access rule further identifies one or more destination hosts to which the access rule applies, i.e., the access rule will be applied to network packets specifying one of the one or more destination hosts. An access rule may also provide an indication whether a networking packet falling under the rule should be blocked or allowed access. Typically, the firewall will block all traffic with a general rule by default and the access rules will then specify which network devices or application can be accessed by the client. An access rule may also provide information on the protocol used to transport the networking packet over the network such as for example TCP, UDP or ICMP. The access rule may therefore define a typical firewall rule as a 5-tuple including source address, destination address, source port, destination port and the protocol.

The identification of the destination hosts in an access rule may include the network or IP address of the destination host which is common in firewall rules. The access rule may then further specify a port number or port number range. This way, network packets can be filtered by the service accessed on the destination host. Alternatively, the identification of the destination hosts may be a host name or Fully Qualified Domain Name (FQDN) uniquely identifying the destination hosts to which the access rule applies.

The identification of the destination hosts may also comprise an identifier for an infrastructure management service optionally together with an attribute. The infrastructure management service then manages the access to these one or more network devices in the private network. The attribute is then indicative for a selection of the one or more network devices managed by the infrastructure management service. This is particularly useful when the destination hosts are not known when the access rule is created or when the destination hosts may change. Such changes may for example occur in virtual computing where the network devices are virtual networking devices that are not specifically related to a specific physical device. By virtual computing, the destination hosts may be created or changed on the fly. An attribute will typically comprise a key-value pair where the key refers to a certain property and the value to a metric or value of the property. The selection may then be done by selection hosts with a certain key, value or combination of both. For a selection by a key, the identifier may take the format service://tag-key:<NAME> where service identifies the network service and <NAME> is the property of the host for which the network addresses should be returned. For a selection by a value, the identifier may take the format service://tag-value:<NAME> where service identifies the network service and <NAME> is the value of the host for which the network addresses should be returned. Also, network addresses with a certain key <KEY> and value <VALUE> pair may be retrieved by the format service://tag:<KEY>=<VALUE>. An example of an infrastructure management service is Amazon Web Services (AWS) which is a collection of cloud computing services, also called web services, that make up a cloud-computing platform offered by Amazon.com. In such a case, the service may be indicated by aws.

A client access list may also comprise a condition linked to one or more of the access rules. While an access rule specifically allows or blocks network packets depending on the 5-tuple, a condition may prevent network packets to pass based on further metrics or attributes when the access rule is triggered.

A first set of possible attributes or client attributes are related to the client device for which the client access applies, i.e., attributes related to the environment the client runs in. Examples of such attributes are a unique device identification number, the operating system running on the client, the type of browser running on the client, the IP address of the client, the authentication method used to logon and whether the client runs a firewall or not. These client-related attributes must typically be provided by the client device itself.

A second set of possible attributes or user attributes are related to the user of the client device and more particularly to the role of the user within the private network and thus within a certain organization. A user's role within an organization often dictates the applications and resources that the user needs access to. Such attributes are typically stored and maintained in a user directory service. The advantage of such a directory service is that it provides a common source of authentication for applications as well as the ability to group users logically by for example department, team or role. The user attributes may therefore refer to attributes stored in such a directory service such as for example a directory service according to the Lightweight Directory Access Protocol (LDAP), a Microsoft Active Directory, a Remote Authentication Dial In User Service (RADIUS) or any combination thereof.

A third set of possible attributes or environment attributes are related to the environment of the client device and/or the private network. Examples of such attributes are time of the day, date and the location of the client.

Any of the above attributes may be used to construct a condition. During operation, the access rule will then only be executed if the condition is fulfilled. A condition may include one or more logical comparisons between an attribute and a value or by performing regular expressions on one or more of these attributes.

A condition may further be linked to an action in the client access list that must be performed when the condition is not fulfilled or met. A first type of action is a remedy action that must be performed by the client or user of the client device. When such a remedy action is validly performed, the condition will either be fulfilled or updated such that the updated condition is fulfilled. Therefore, after performing the remedy action, the client device will be allowed to access the private network according to the respective access rule. A remedy action may include a request for authentication or further authentication by the user of the client device. Such an authentication may be a more secure or protected authentication than the one already provided. The remedy action may be a request to authenticate with a one-time password (OTP) or to perform a two-factor authentication. A second type of action is an informative action where information is to be displayed or provided to the client device on the condition that was not met. This way, the user is informed on the reason why his network access is blocked. A third type of action is an interactive action including a request for information from the user. Such an interactive action may also be a remedy action where the client will be allowed access according to the access rule upon providing the information. A fourth type of action further referred to as an interrupt action is to stop the firewall completely for the respective client for example by putting the firewall in full blocking mode and/or by interrupting the networking tunnel between the gateway and client. Such an action may be used by a blocking access rule and a condition which is always met. This way, the action will always be performed when the access rule is triggered. An interrupt action can be used to protect the private network further because it allows to block a user or device completely when it tries to connect to certain network devices or applications in the private network.

FIG. 4A to FIG. 4D show examples of entries in a client access list wherein each entry includes:
  a name (NAME) to identify the entry,
  the condition (CONDITION) that must be fulfilled for access rules under this name,
  the action (ACTION) that will be taken when the condition is not fulfilled, and/or
  one or more access rules (ACCESS RULES).
  The access rule may further include:
  the type of firewall rule (RULE) which is typically 'allow', i.e., network traffic is allowed to pass when the firewall rule is triggered, or 'block', i.e., network traffic is blocked when the firewall rule is triggered;
  the protocol (PROTOCOL) of the network traffic, for example ICMP (icmp), TCP (tcp) or UDP (udp);
  the flow direction (DIRECTION) of the network traffic for which the access rule applies;
  the identification of the destination hosts (HOSTS) of the firewall rule; and/or
  the destination ports or ICMP types as specified in the network traffic for respectively the TCP/UDP and ICMP protocol.

In FIG. 4A, an entry is shown including access rules that define firewall rules for access to virtual hosts provided by the Amazon Web Services. The firewall rule will be triggered when the client 121 would attempt to access anyone of the hosts in the private network 140 on ports 22 or 3389 or by any ICMP packet. Before the actual firewall rule will grant access (allow), the condition also must be fulfilled that the client 121 does not access the private network 140 from a public network (NOT(PublicNetwork)) or (||) that the client has provided a one-time password (OTP). If the two conditions are not fulfilled, the client will receive (ACTION) a request to provide the OTP.

In FIG. 4B, an entry is shown including an access rule that defines a firewall rule that allows ICMP access to a range of hosts specified by their IPv4 address. The condition is always true. Therefore, every time the firewall is triggered, the client 121 will display a message "This pinging action is logged by our system" to the user.

In FIG. 4C, an entry is shown including access rules that define firewall rules for ICMP and TCP to a host specified by its domain name. The firewall rule will only be applied on the condition that the client runs a local firewall (LocalFWActive). When this is not the case upon triggering the firewall rule, the client 121 will display a message "Activate firewall to access github.local.com" to the user.

In FIG. 4D, an entry is shown including access rules that define firewall rules for blocking ICMP and TCP network traffic to a host specified by its IPv4 address. The condition is always false and the interrupt action will thus always be performed, i.e., the firewall will stop and all network traffic between the client and the private network 140 will be blocked.

Figure 5:
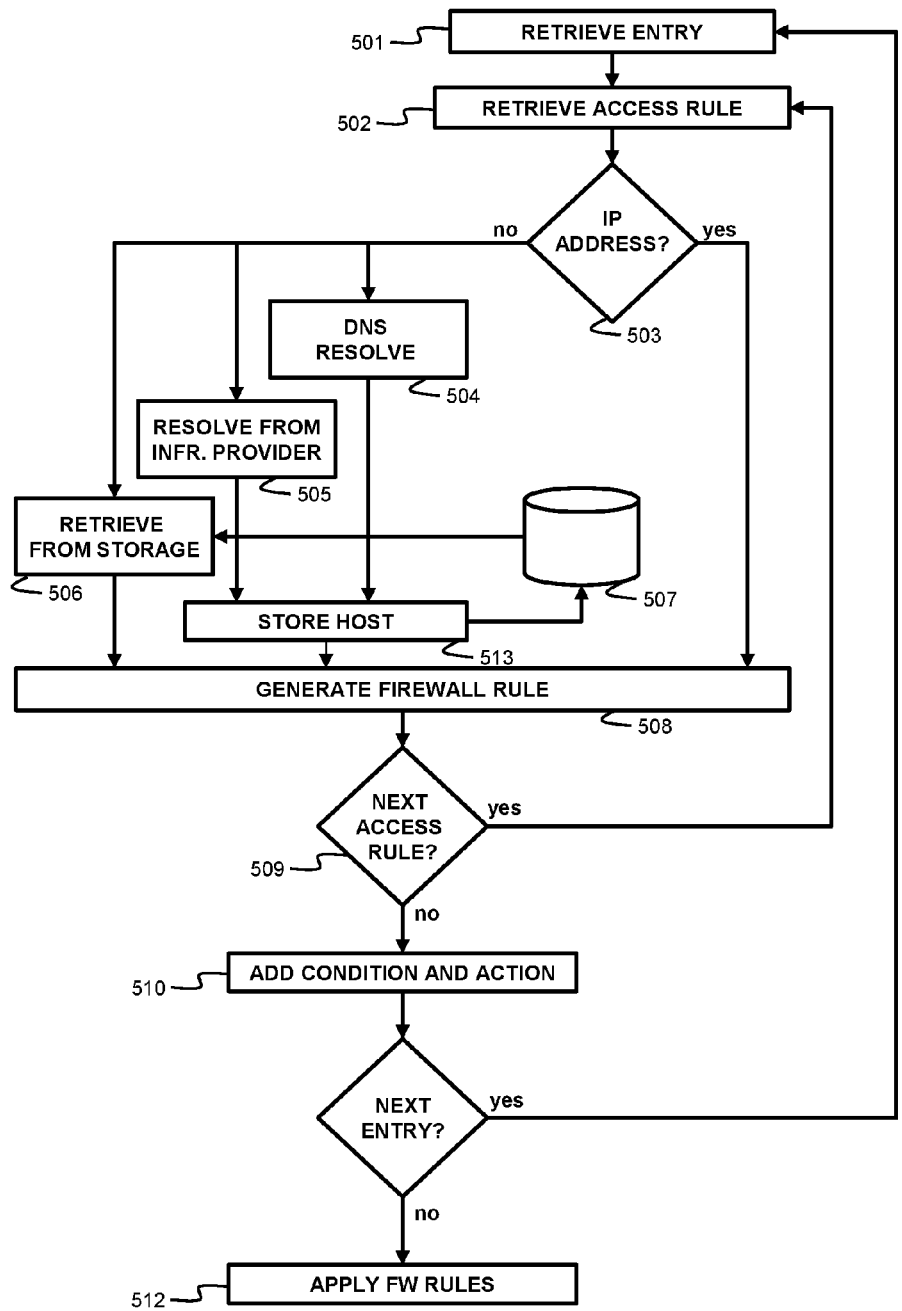
FIG. 5 shows an exemplary process for deriving firewall rules from a client access list executed by components of the present disclosure.

FIG. 5 shows an exemplary process that may be executed by components of the present disclosure including the gateway 100 according to FIG. 1. More particularly, it may be executed by management module 102 for performing the step 208 of FIG. 2 where the firewall rules are derived from the client access list and applied accordingly in firewall service 311. In step 501 the process retrieves a first entry from the client access list. An entry includes one or more access rules linked to an optional condition and action. Examples of entries are shown in FIG. 4A to FIG. 4D. Then, the process retrieves in step 502 the first access rule from the entry and checks under step 503 if the host is specified by its network address. If so, the process directly proceeds to step 508. If not, the process will first resolve the network addresses related to the host. If the host is specified by its host name or FQDN, then a DNS address lookup is performed in step 504. If the host is specified by a reference to an infrastructure management service, then the service is polled under step 505 and the one or more addresses are returned. The resolved host addresses may be stored in a memory store 507 under step 513 such that they can be used later on. If the host was already resolved before, the process will retrieve the network address(es) under step 506 from the memory store 507. After the hosts have been resolved, the process proceeds to step 508 where one or more firewall rules are created from the address, protocol and application information in the access rule. Then, under condition 509, when there is another access rule in the entry, the process returns to step 502 to process the next access rule of the current entry. Otherwise, the process proceeds to step 510. When the entry includes a condition and/or action, these are also linked to the set of firewall rules derived from the entry under step 508. If there is another entry in the client access list, the process returns to step 501 and processes the next entry in the client access list. Otherwise, the process proceeds to step 512 and applies all the derived firewall rules to the firewall.

Figure 6:
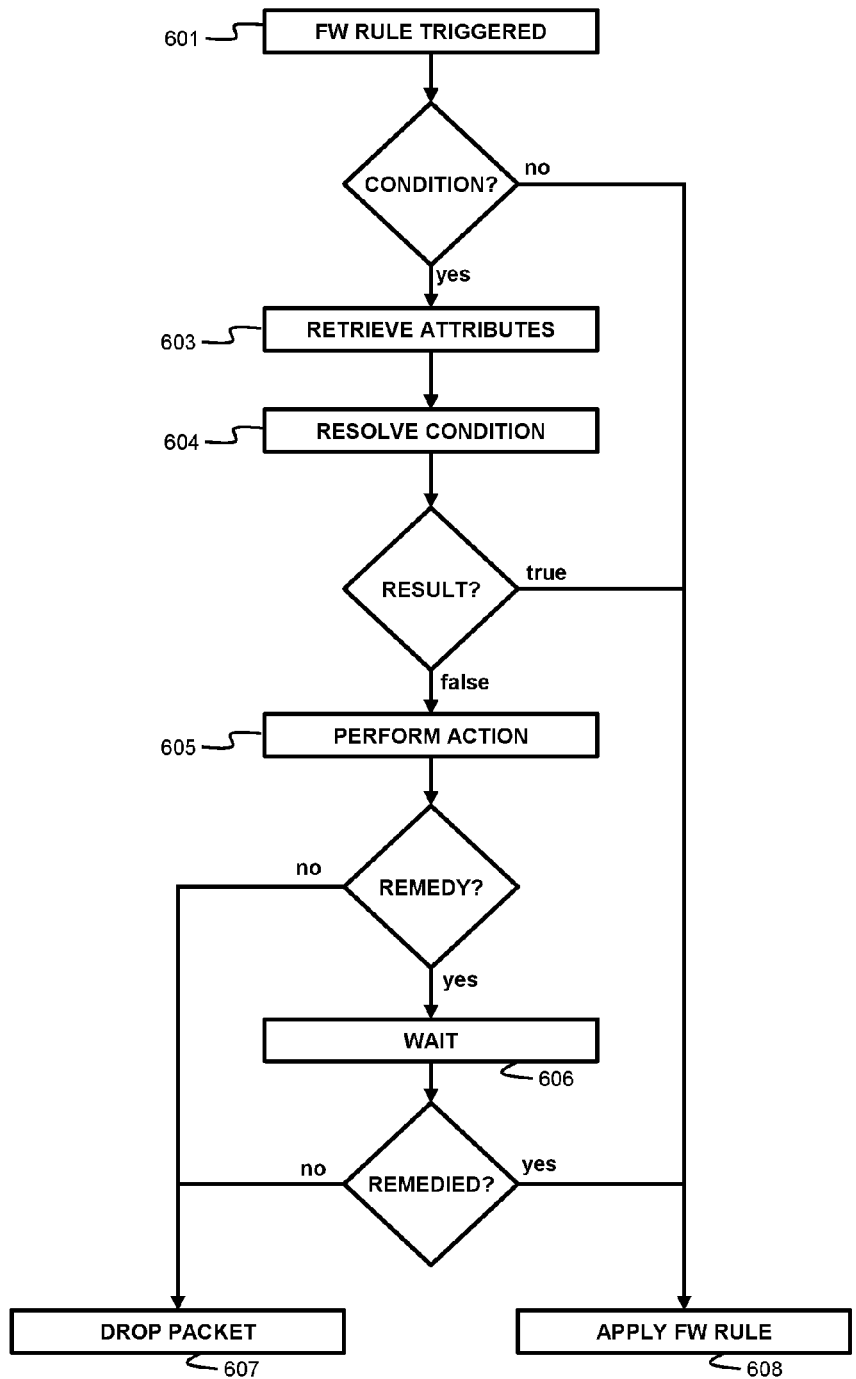
FIG. 6 shows an exemplary process for dropping or allowing network packets executed by components of the present disclosure.

FIG. 6 shows an exemplary process that may be executed by components of the present disclosure including the gateway 100 according to FIG. 1. More particularly, it illustrates the steps performed by firewall service 311 when a firewall rule is triggered. During operation of the firewall service 311, network packets traversing the firewall are each time inspected against the firewall rules 321. When a network packet falls under a firewall rule (i.e., when source, destination and protocol of the packet corresponds to those of the rule), it is said that the firewall rule is triggered. The process of FIG. 6 starts with step 601 when a firewall has been triggered. Subsequently, it is checked whether there is a condition linked to the firewall rule.

If there is no condition linked, the process directly proceeds to step 608 where the firewall rule is applied (i.e., the network packet is blocked or allowed according to the rule). If a condition is linked to the firewall rule, the process proceeds to step 603 where the attributes for checking the condition are retrieved. Depending on the type of attribute, the attributes may be retrieved in different ways. For client attributes, the information has normally to be provided by the client itself (i.e., the client must provide the attributes to the gateway). This may be done by providing the attributes over the first networking connection established under step 202 of FIG. 2. The management module 102 then extracts the attributes and provides them to the appropriate firewall service 311 together with the firewall rules. For user attributes, the management module may retrieve the attributes from an appropriate directory service such as LDAP, RADIUS or Active Directory. This may for example be done upon the creation of the firewall rules from the client access list. For the environment attributes, local variables may be available such as for date and time, or the information may be fetched elsewhere. For example, to retrieve information on the locality of the client, a service may be consulted that provides geographical location data based on the network address of the client. As the attributes may change during the connection of the client, the management module may refresh the attributes on a regular basis, for example at regular time intervals or every time when the firewall rule is triggered.

When all attributes are retrieved by the firewall service 311, the process proceeds to step 604 where the condition itself is resolved (i.e., whether it returns true or false). If the condition is fulfilled, the firewall rule is applied in step 608. If the condition is not fulfilled, the process proceeds to step 605 where the corresponding action is performed. Alternatively, if there is no corresponding action, the process may directly proceed to step 607 and not apply the firewall rule, i.e., drop the networking packet (not shown in figure). If the performed action is not a remedy action, the process directly proceeds to step 607.

If the unfulfilled condition can be remedied, the process proceeds to step 606 where it waits until the user of the client has remedied the false condition. If the user doesn't remedy the condition, the process proceeds to step 607 and drops the network packet. If the user remedies the condition, the process proceeds to step 608 and applies the firewall on the networking packet. The waiting step may further be performed for a predetermined duration such that the process will always proceed to either step 607 or 608.

In one embodiment, one or more policies are used, which results in the client access rules described above (e.g., the client access rules are generated by the controller based on the policy). For example, these policies may reside on controller 170, and are used to define and/or generate the client access rules. One or more new access rules can be generated in response to a change or update in the policy.

If one or more policies (e.g., residing on controller 170 or on another computing device) are updated, the client access rules (and corresponding firewall rules) are updated in real-time, as long as the client device has an active tunnel connection with the gateway 100 (e.g., the firewall rules on the gateway 100 are updated in real-time during an active connection on an established network tunnel).

In one embodiment, signed tokens can be used in the authentication described herein. These signed tokens can be used to update the access rules in real-time on the gateway. For example, the client device can send a new access rule to the gateway along with a signed token. After authenticating the signed token, the new access rule is used to derive one or more new firewall rules.

In one embodiment, one or more firewall rules are regularly or periodically updated in real-time each time a new signed token is issued by the client device and uploaded to the gateway. These firewall rules define or describe access by one or more client devices, for example access as described above.

Various, non-limiting examples of systems and methods that relate to allowing access between a client device and other computing devices (e.g., application servers and or other network devices) that can be used with the method above are described in U.S. Pat. No. 9,148,408, issued Sep. 29, 2015 (inventors Glazemakers et al.), and entitled "SYSTEMS AND METHODS FOR PROTECTING NETWORK DEVICES", the entire contents of which patent is incorporated by reference as if fully set forth herein.

U.S. Pat. No. 9,148,408 describes the use of tokens to define access for clients. In addition, U.S. Pat. No. 9,148,408 describes a method of making use of tokens to configure a firewall service. These tokens are sent to the gateway (e.g., by the client device) when establishing a tunnel connection.

In some embodiments, access or authentication updates are implemented using signed tokens (e.g., such as with a token described in U.S. Pat. No. 9,148,408). According to one embodiment, a signed token can be used to provide real-time updates. For example, if a policy changes on the controller 170, a client device can upload a new, signed token in real-time that will cause updating of the firewall rules on the gateway in real-time (i.e., during an active connection on the network tunnel, and after the tunnel has been previously established). In contrast to the foregoing, in traditional VPN-style approaches, the firewall or access settings are only enforced during a client authentication process, which means, for example, that the client needs to logoff and authenticate again to get the latest policy updates. In one embodiment, authentication using the signed token may be performed as described for authentication of tokens in U.S. Pat. No. 9,148,408.

In one embodiment, in response to an update to a policy (e.g., as initiated or controlled by the controller) after establishing a network tunnel, a signed token is received by the gateway that comprises at least one of a new access rule or new authentication information (e.g., a new credential for a user associated with a client device). The token is authenticated, for example, by communication with the controller. In response to authenticating the token, at least one of the firewall rules is updated in real-time while the network tunnel is active (i.e., prior to termination of the tunnel). This real-time updating feature avoids any need to terminate and/or re-establish the tunnel whenever there may be a change or update in an access rule and/or the authentication information. In one embodiment, the token is received from the client device. The policy, for example, may govern access rights, etc., for the client device.

Figure 7:
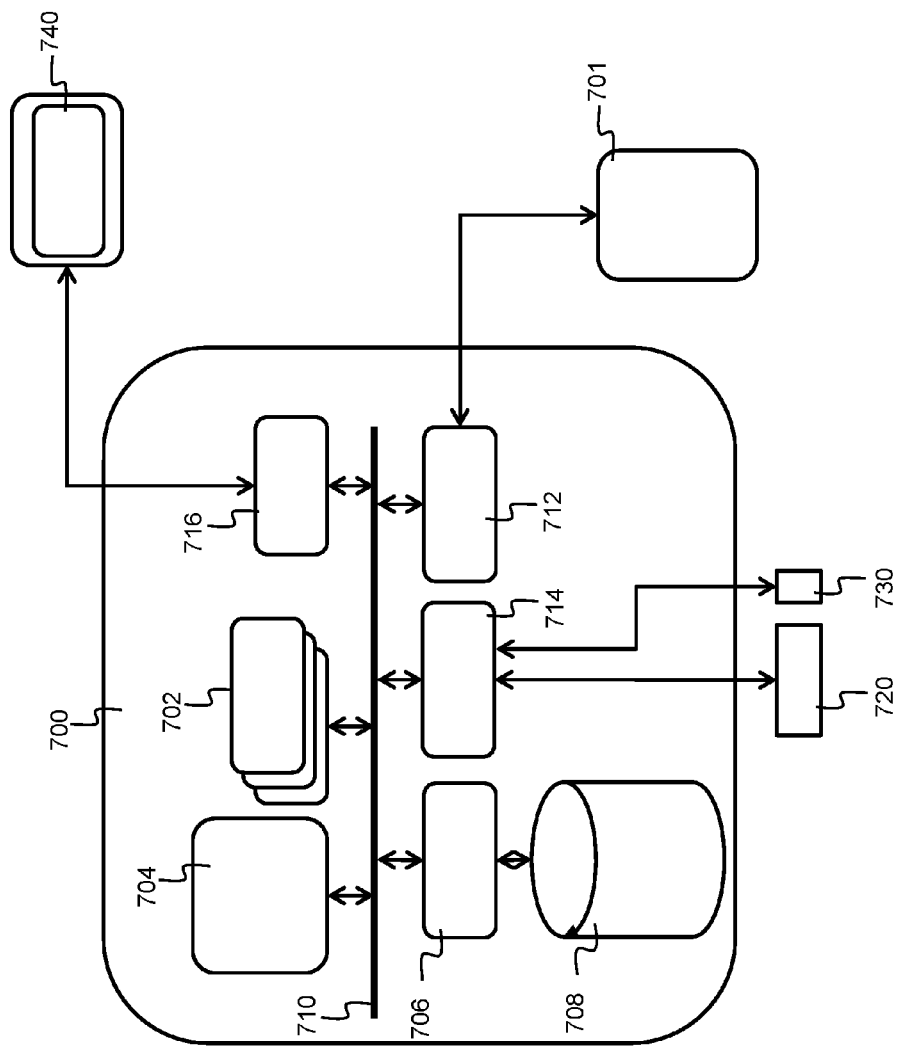
FIG. 7 illustrates an exemplary computing system according to one embodiment.

FIG. 7 shows a suitable computing system 700 for implementing the gateway according to the above embodiments. Computing system 700 may in general be formed as a suitable general purpose computer and include a bus 710, one or more processor cores 702, a local memory 704, one or more optional input interfaces 714, one or more optional output interfaces 716, one or more communication interfaces 712, a storage element interface 706 and one or more storage elements 708. Bus 710 may include one or more conductors that permit communication among the components of the computing system 700. Processor cores 702 may include any type of conventional processor or microprocessor that interprets and executes programming instructions. Local memory 704 may include a random access memory (RAM) or another type of dynamic storage device that stores information and instructions for execution by processor cores 702 and/or a read only memory (ROM) or another type of static storage device that stores static information and instructions for use by processor 702. Input interface 714 may include one or more conventional mechanisms that permit an operator to input information to the computing device 700, such as a keyboard 720, a mouse 730, a pen, voice recognition and/or biometric mechanisms, etc. Output interface 716 may include one or more conventional mechanisms that output information to the operator, such as a display 740. Communication interface 712 may include any transceiver-like mechanism such as for example one or more Ethernet interfaces that enables computing system 700 to communicate with other devices and/or systems 701. The communication interface 712 of computing system 700 may be connected to such another computing system by means of a local area network (LAN) or a wide area network (WAN) such as for example the internet. Storage element interface 706 may include a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, memory cards, . . . could be used. The system 700 described above may also run as a virtual machine above the physical hardware.

Steps performed according to the above processes may be implemented as computer-executable instructions. These instructions may then be executed on processor cores 702 upon performing the processes. This way, steps executed by tunnel module 101, management module 102, tunnel services 150, 151 and firewall services 111-116 may for example be implemented as instructions on computing system 700 thereby implementing gateway 100. Processing cores 702 may correspond to processing cores 160, 161 of gateway 100. A tunnel service 150, 151 is then run on each of the processing cores 702. Each processing core 702 then runs separate firewall services respectively started by one of the tunnel services. Data packet communication between client devices 121-126 and the gateway 100 may be performed over a networking interface 712. Also, data packets communicated between gateway 100 and private network 140 may be exchanged over a networking interface 712. The computer-executable instructions may form or be part of a computer program product that is stored on storage element 708 or any computer readable storage medium.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may include Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signalling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may be included in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims

What is claimed is:

1. A computer-implemented method, comprising:
    upon a request from a client device, establishing, by a computer system implementing a gateway to a private network, a network tunnel between the client device and the gateway, the gateway implementing a firewall including firewall rules for selectively blocking and allowing network traffic between the client device and one or more network devices in the private network, wherein:
        the establishing the network tunnel comprises receiving, by the computer system, a client access list from the client device and verifying whether the client access list was not altered by the client device,
        the client access list is requested by the client device from an authentication server, and
        the client access list is signed by the authentication server such that alteration of the client access list can be verified by the computer system;
    upon a triggering of a firewall rule by a request for access to the private network by the client device and before applying the firewall rule, checking, by the computer system, whether a corresponding condition is met; and
    in response to a determination that the condition is not met, sending, by the computer system, to the client device, a first action to be performed by the client device.

2. The method according to claim 1, further comprising: applying the firewall rule if the condition is met.

3. The method according to claim 1, wherein the first action relates to a request for authentication by a user of the client device for access to a network device accessible by the firewall rule, and the method further comprises:
    receiving, by the computer system, an indication that the user was validly authenticated;
    updating, by the computer system, the condition as being met; and
    applying, by the computer system, the firewall rule.

4. The method according to claim 3, wherein the request for authentication comprises a request for a password or a request for a one-time password.

5. The method according to claim 1, wherein the first action relates to:
    after a determination that the condition is not met, a display of information about the condition; or
    a request to a user of the client device to provide information regarding a reason for accessing the private network according to the firewall rule.

6. The method according to claim 1, wherein the client access list comprises:
    one or more access rules allowing the gateway to derive firewall rules comprising the firewall rule;
    one or more conditions, each condition related to one or more of the derived firewall rules, the one or more conditions comprising the corresponding condition for the firewall rule; and
    one or more actions comprising the first action, wherein each action is related to a respective condition and is to be performed when the respective condition is not met.

7. The method according to claim 6, wherein an access rule of the one or more access rules comprises a first identifier indicative for one or more hosts in the private network, the first identifier is a host name or a fully-qualified domain name, and the method further comprises:
    looking up, by the computer system, a corresponding network address or addresses of the host name or fully-qualified domain name; and
    creating, by the computer system, a firewall rule with the client device as a source address and the corresponding network address as a destination address.

8. The method according to claim 7, wherein the first identifier comprises an identifier for an infrastructure management service providing access to one or more network devices in the private network and an attribute indicative for a selection of the one or more network devices; and the method further comprises:
    retrieving from the infrastructure management service a selection of hosts characterized by the attribute; and
    creating respective firewall rules with the client device as a source address and the respective hosts of the selection as a destination address.

9. The method according to claim 6, wherein a condition of the one or more conditions comprises a condition on one or more of:
    one or more attributes obtainable from the client device;
    one or more attributes related to a user of the client device; or
    one or more attribute related to an environment of the client device.

10. The method according to claim 9, wherein the one or more attributes obtainable from the client device comprises one of:
information on an operating system of the client device;
information on a firewall on the client device;
information on a virus protection mechanism on the client device; or
network settings and addresses of the client device.

11. The method according to claim 9, wherein the one or more attributes related to the user of the client device comprises one of:
a security group to which the user belongs; or
a user name of the user.

12. The method according to claim 9, wherein the one or more attributes related to the environment of the client device comprises one of:
a time of day;
a geographical location; or
a local network address of the client device.

13. The method according to claim 1, wherein the establishing the network tunnel further comprises starting a separate firewall service with the firewall rules on the computer system.

14. The method according to claim 1, wherein the condition is by default unmet, and wherein the method further comprises upon triggering the firewall rule, resetting, by the computer system, the firewall by blocking all access from the networking device to the private network.

15. The method according to claim 1, further comprising:
in response to an update in a policy after establishing the network tunnel, receiving, from the client device, a signed token; and
in response to receiving the signed token, updating at least one of the firewall rules.

16. The method according to claim 15, wherein the client access list comprises one or more access rules allowing the gateway to derive the firewall rules.

17. The method according to claim 16, further comprising:
receiving a new access rule from the client device; and
authenticating the signed token;
wherein the at least one firewall rule is derived in real-time from the new access rule after authenticating the signed token.

18. The method according to claim 1, further comprising:
in response to an update in a policy after establishing the network tunnel, receiving a token comprising at least one of a new access rule or new authentication information;
authenticating, via communication with a controller, the token; and
in response to authenticating the token, updating at least one of the firewall rules in real-time while the network tunnel is active.

19. The method according to claim 18, wherein the controller generates the update to the policy, and the token is received from the client device.

20. A non-transitory computer readable storage medium storing instructions configured to instruct a computing system to:
upon a request from a client device, establish a network tunnel between the client device and a gateway, the gateway implementing a firewall including firewall rules for selectively blocking and allowing network traffic between the client device and at least one network device in a private network, wherein:
the establishing the network tunnel comprises receiving, by the computing system, a client access list from the client device and verifying whether the client access list was not altered by the client device,
the client access list is requested by the client device from an authentication server, and
the client access list is signed by the authentication server such that alteration of the client access list can be verified by the computing system;
in response to triggering of a firewall rule by a request for access to the private network by the client device and before applying the firewall rule, check whether a corresponding condition is met; and
in response to a determination that the condition is not met, send, to the client device, an action to be performed by the client device.

21. A system, comprising:
at least one hardware processor; and
memory storing instructions programmed to instruct the at least one hardware processor to:
upon a request from a client device, establish a network tunnel between the client device and a gateway, the gateway implementing a firewall including firewall rules for selectively blocking and allowing network traffic between the client device and one or more network devices in a private network, wherein:
the establishing the network tunnel comprises receiving a client access list from the client device and verifying whether the client access list was not altered by the client device,
the client access list is requested by the client device from an authentication server, and
the client access list is signed by the authentication server such that alteration of the client access list can be verified;
upon a triggering of a firewall rule by a request for access to the private network by the client device and before applying the firewall rule, check whether a corresponding condition is met; and
in response to a determination that the condition is not met, send, to the client device, an action to be performed by the client device.

* * * * *